United States Patent
Salter et al.

(10) Patent No.: US 10,146,226 B1
(45) Date of Patent: Dec. 4, 2018

(54) AUTONOMOUS VEHICLE SEQUENTIAL RAILCAR LOADING AND ALIGNMENT

(71) Applicant: Ford Global Technologies, LLC, Dearborn, MI (US)

(72) Inventors: Stuart C. Salter, White Lake, MI (US); Pietro Buttolo, Dearborn Heights, MI (US); Annette Lynn Huebner, White Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/669,695

(22) Filed: Aug. 4, 2017

(51) Int. Cl.
  *G05D 1/02* (2006.01)
  *B61D 47/00* (2006.01)
  *B61D 3/18* (2006.01)
  *B61L 15/00* (2006.01)
  *G05D 1/00* (2006.01)

(52) U.S. Cl.
  CPC .......... *G05D 1/0225* (2013.01); *B61D 3/187* (2013.01); *B61D 47/005* (2013.01); *B61L 15/0072* (2013.01); *G05D 1/0285* (2013.01); *G05D 1/0088* (2013.01)

(58) Field of Classification Search
  USPC ....................................................... 701/23
  See application file for complete search history.

(56) References Cited

U.S. PATENT DOCUMENTS

| 5,853,280 | A  | * | 12/1998 | Lohr ..................... B60P 3/08 414/482 |
| 6,363,173 | B1 | * | 3/2002  | Stentz ................. E02F 9/2045 382/153 |
| 8,038,381 | B2 |   | 10/2011 | Boettcher et al. |
| 9,384,666 | B1 |   | 7/2016  | Harvey |
| 2007/0136123 | A1 | * | 6/2007 | Schiller ............ G06Q 10/06375 705/7.37 |
| 2018/0004228 | A1 | * | 1/2018 | Zarella ................. G05D 1/0287 |

FOREIGN PATENT DOCUMENTS

| DE | 102014224092 A1 | 6/1916 |
| DE | 3616484 A1 | 11/1987 |
| DE | 102008033334 A1 | 1/2010 |

* cited by examiner

*Primary Examiner* — Tyler D Paige
(74) *Attorney, Agent, or Firm* — James P. Muraff; Neal, Gerger & Eisenberg LLP

(57) ABSTRACT

Method and apparatus are disclosed for autonomous vehicle sequential car loading and alignment. A vehicle comprising a wireless communication module and a processor. The processor determines whether the vehicle will fit inside a string of railcars based on capacity and dimension data received from the railcars. When the vehicle fits, the processor autonomously navigates the vehicle to a farthest available space on the string of railcars, and positions the vehicle within the space to satisfy spacing requirements.

18 Claims, 4 Drawing Sheets

AUTONOMOUS VEHICLE SEQUENTIAL RAILCAR LOADING AND ALIGNMENT

TECHNICAL FIELD

The present disclosure generally relates to autonomous vehicles and, more specifically, autonomous vehicle sequential car loading and alignment.

BACKGROUND

Often, vehicles are shipped from factories via railcars. Generally, five to eight auto railcars are loaded up in a single string. The doors of the railcars are opened up and bridge plates are laid down between the railcars. Workers drive the vehicle into the railcars and all the way to the next available spot in one of the auto railcars until the auto railcar is full. Auto railcars generally have two versions: (a) a two level railcar (sometime referred to as "bi-level railcars") that holds taller vehicles (e.g., truck, SUVs, etc.), and (b) a three level railcar (sometimes referred to as "tri-level railcars") that holds shorter vehicles (e.g., sedans, compact, etc.). A portable ramp (sometimes referred to as a "buck ramp") is used to facilitate the vehicles being loaded onto the different levels. When five railcars are being loaded, the workers load one level for all five railcars and then move to the next level.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for autonomous vehicle sequential car loading and alignment. A vehicle comprising a wireless communication module and a processor. The processor determines whether the vehicle will fit inside a string of railcars based on capacity and dimension data received from the railcars. When the vehicle fits, the processor autonomously navigates the vehicle to a farthest available space on the string of railcars, and positions the vehicle within the space to satisfy spacing requirements.

An example system includes a railcar and a buck ramp. The railcar broadcasts dimension data including the height to levels inside the railcar, communicates capacity data to approaching autonomous vehicles, and when one of the levels of the railcar is full, broadcast a message indicating the one of the levels is full. The buck ramp autonomously adjusts a height of the buck ramp to a different level when one of the levels of the railcar is full.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
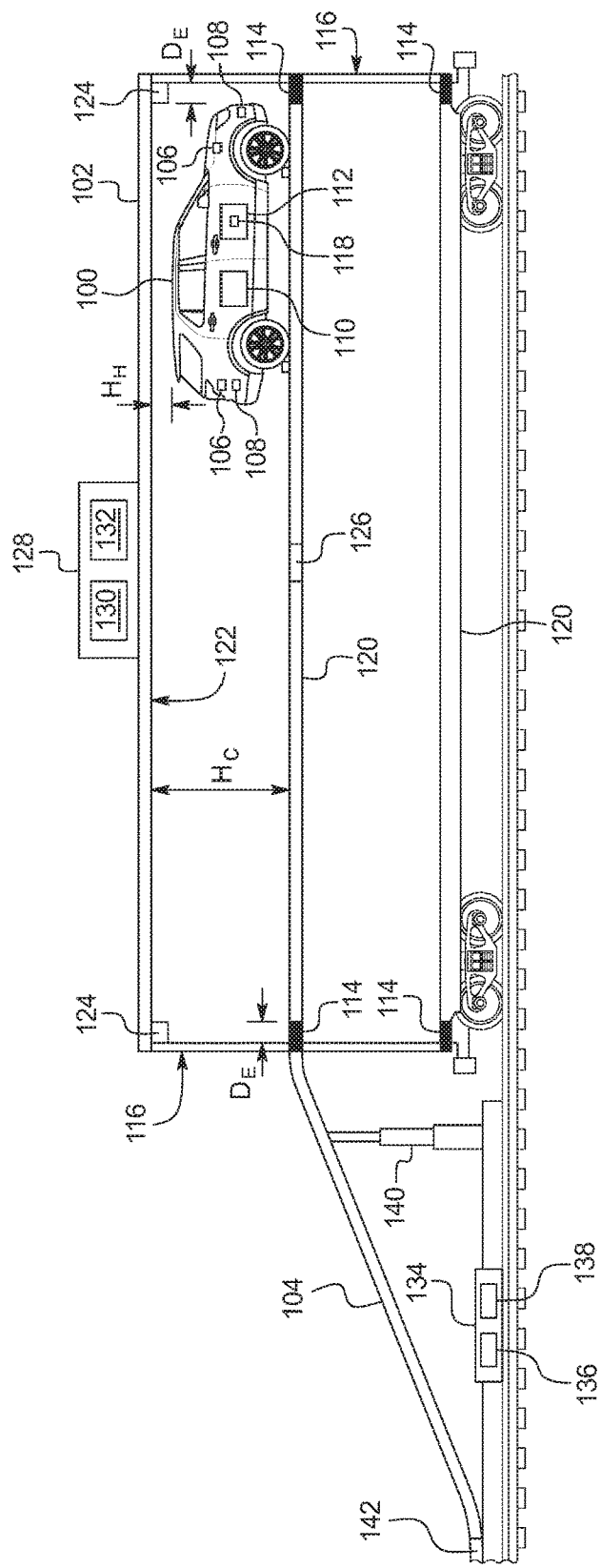
FIG. 1 illustrates an autonomous vehicle loaded into a auto railcar in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Autonomous vehicles will be shipped via auto railcars after being manufactured. Autonomous vehicles include electronics and software to control the motive functions of the vehicle without direct driver control. As such, autonomous vehicles will need to be able to load themselves into the auto railcars without workers while meeting standards for transporting vehicles by rail. The height of each level of the auto railcar is adjusted to accommodate various sizes of vehicles (e.g., sedans, trucks, SUVs, compacts, etc.). For example, depending on the type of railcar (e.g., a bi-level railcar or a tri-level railcar), the height each level may vary from 62 inches to 94 inches. Standards for shipping vehicle require a minimum of 3 inches of clearance from the roof of the vehicle to the top of the railcar/level. For example, if a vehicle is 58.4 inches tall, the minimum height of a level in a railcar that the vehicle can be loaded into may be 61.4 inches. Additionally, the vehicles inside the railcars have spacing requirements. For example, the vehicle may be required to be park five inches from the front or rear door and have a space of three inches between vehicles.

As disclosed below, an autonomous vehicle includes a wireless module to coordinate with a wireless module of the railcars and a wireless module of a buck ramp to autonomously load into the railcars. The wireless module of the railcar advertises the heights of its levels and its status (e.g., number of cars per level loaded). Additionally, in some examples, the wireless module of the railcar obtains identifying information (e.g., vehicle identification number, manufacturer serial number, etc.) from vehicles loaded onto the particular railcar to be forwarded to an inventory management system. The vehicle determines whether it can be loaded onto the railcar based on the railcar advertisement. For example, the vehicle determines whether each level is tall enough for the vehicle to be loaded and whether there is space for the vehicle to be loaded. Additionally, when there is space on the rail car, using range detection sensors and/or cameras, the vehicle parks itself on the railcar in the next available space observing spacing requirements. In some examples, the wireless module of the buck ramp determines whether the vehicle will fit on a level of the railcars. In such examples, when the vehicle will not fit, the buck ramp prevents the vehicle from boarding (e.g., by raising a lift gate, etc.). In some examples, when the railcar signals that that a sequential level (e.g., all of the corresponding levels of the connected sequential rail cars) is full, the buck ramp changes it height to the next available level.

Figure 2:
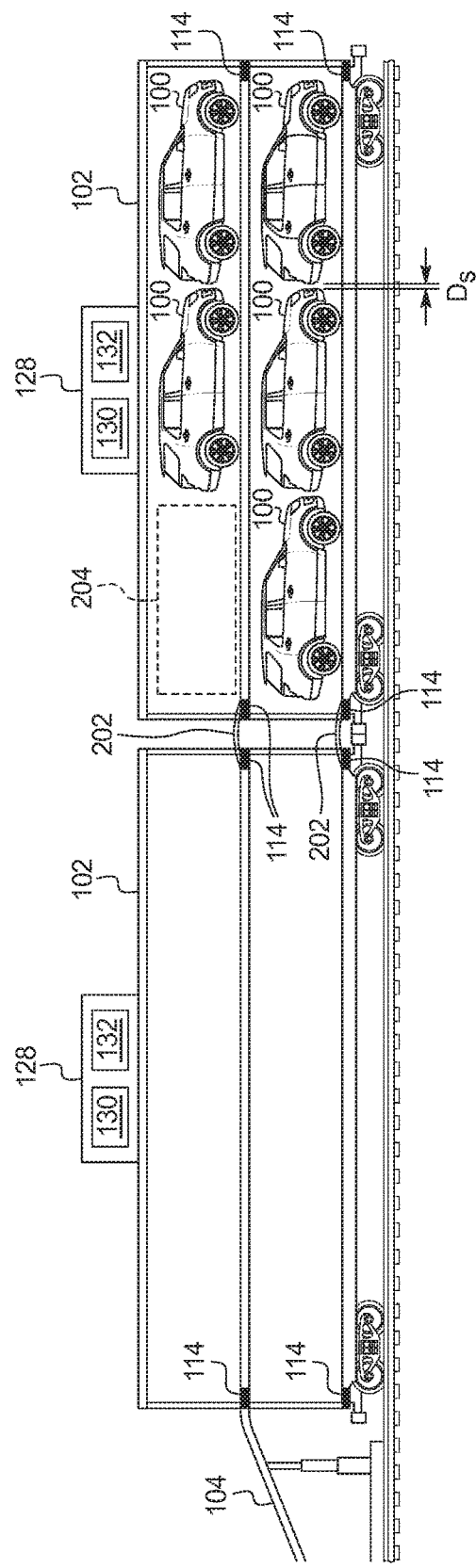
FIG. 2 illustrates a string of railcars being loaded with the autonomous vehicles.

FIGS. 1 and 2 illustrate an autonomous vehicle 100 loaded into railcars 102 via a buck ramp 104 in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 is an autonomous vehicle (e.g., the motive functions are controlled by the vehicle 100 without direct driver input). In the illustrated example the vehicle 100 includes a camera 106, range detection sensors 108, a vehicle wireless module 110 and an autonomy unit 112.

The camera 106 is positioned on the vehicle 100 to capture images of an area around the vehicle 100. In some examples, the vehicle 100 includes multiple cameras 106 (e.g., a front-facing camera, a rear-facing camera, etc.) and/or a omni-directional camera. The camera(s) 106 are used to detect indicia 114 in the railcars 102 indicating the space between the vehicle 100 and the edge 116 of the railcars 102 to facilitate that there is an edge distance ($D_E$) between the vehicle 100 and the edge 116 of the railcar 102. The sensors 108 (e.g., RADAR, LiDAR, ultrasonic sensors, etc.) use electromagnetic radiation to detect objects around the vehicle 100. In the illustrated example, the sensors 108 are used to detect other vehicles so the vehicle 100 can maintain a vehicle separation distance ($D_S$) from the other vehicles.

The vehicle wireless module 110 includes wireless network interfaces to enable communication with the railcar 102, the buck ramp 104, and/or external networks. The vehicle wireless module 110 includes hardware (e.g., processors, memory, storage, antenna, etc.) and software to control the wireless network interfaces. The vehicle wireless module 110 includes one or more communication controllers for standards-based networks (local area wireless networks (including IEEE 802.11 a/b/g/n/ac or others), dedicated short range communication (DSRC), personal area networks (e.g., BLUETOOTH®, Z-WAVE®, ZIGBEE, etc.)).

The autonomy unit 112 is in communication with the electronic control units (ECUs) that control the motive functions (e.g., steering, brake, and throttle, etc.) of the vehicle 100. The autonomy unit 112 includes hardware and firmware to facilitate navigating the vehicle 100 in various traffic scenarios without driver intervention using the camera(s) 106 and/or the sensors 108 and navigational data/vehicle position data (e.g., coordinates from global positioning system (GPS) receivers, horizon data, vehicle status data from an inertial measurement unit (IMU), etc.). The autonomy unit 112 uses the sensor data and the navigational data/vehicle position data to determine the pose of the vehicle 100 and plan the motion of the vehicle 100. In the illustrated example, the autonomy unit 112 includes a railcar loader 118.

The railcar loader 118 autonomously loads the vehicle 100 onto the railcars 102. The railcar loader 118 receives information, via the vehicle wireless module 110, from the railcars 102. The information includes the height ($H_C$) of a space defined by platforms 120 of the railcars 102 and the ceiling 122 of the railcars 102 and/or the upper platforms 120. Based on the height ($H_C$) and a height of a required headroom ($H_H$) (e.g., 3 inches, 5 inches, etc.), the railcar loader 118 determines whether it fits within the railcars 102. For example, if the height ($H_C$) of the levels of the railcars 102 is set to 65 inches and the height of the vehicle is 70 inches, the railcar loader 118 may determine that it will not fit within the railcars 102. When the vehicle 100 does fit, the railcar loader 118 proceeds to navigate the vehicle 100 to the buck ramp 104 and into the railcars 102.

The railcar loader 118 navigates the vehicle 100 to the next available space in one of the railcars 102 (e.g., which may be a different railcar 102 than the one the vehicle initially enters) in the furthest one of the railcars 102 until the railcar loader 118 receives a message from the next railcar 102 that it is full. Using the camera(s) 106 and/or the sensors 108 the railcar loader 118 determines when the next available spot is (i) at a front of one of the railcars 102, (ii) behind another vehicle, and/or (iii) at a back of one of the railcars 102. When the vehicle 100 is in the front of one of the railcars 102, the railcar loader 118 determines its parking spot based on the indicia 114 on the platform 120 of the railcar 102. When the vehicle 100 is behind another vehicle, the railcar loader 118 uses the sensors 108 to maintain the vehicle separation distance ($D_S$) between the vehicle 100 and the other vehicle. When the vehicle 100 is at the back of one of the railcars 102, the railcar loader 118 uses the camera(s) 106 to maintain the separation distance ($D_E$) between the edge 116 of the railcar 102 and the back of the vehicle 100 based on the indicia 114 on the platform 120. When the railcar loader 118 cannot maintain the vehicle separation distance ($D_S$) and the edge separation distance ($D_E$), the railcar loader 118 (a) broadcasts a message requesting that the other vehicles reposition to make more room, (b) reverses the vehicle 100 to park in a different one of the railcars 102, and/or (c) sends a warning message to the railcar 102 to be forwarded to a remote server.

In the illustrated example, the railcars 102 include the platforms 120 with the indicia 114, detection sensors 124, level sensors 126 and a railcar wireless module 128. The detection sensors 124 (e.g., cameras, ultrasonic sensors, etc.) are used to determine the current capacity of the railcar 102 by detecting the vehicle 100 entering and exiting the railcar 102 and comparing the number of vehicles 100 that enter to the number of vehicles 100 that exit. The level sensors 102 are linear position sensors connected to the platforms 120 to track the height of the platform 120 when it is adjusted to determine the height ($H_C$) of a space defined by platforms 120 of the railcars 102 and the ceiling 122 of the railcars 102 and/or the upper platforms 120.

The railcar wireless module 128 includes a communication module 130 and a railcar manager 132. The communication module 130 includes wireless network interfaces to enable communication with the vehicle 100, the buck ramp 104, and/or external networks. The communication module 130 includes hardware (e.g., processors, memory, storage, antenna, etc.) and software to control the wireless network interfaces. The communication module 130 includes one or more communication controllers for standards-based networks (local area wireless networks (including IEEE 802.11 a/b/g/n/ac or others), dedicated short range communication (DSRC), personal area networks (e.g., BLUETOOTH®, Z-WAVE®, ZIGBEE, etc.)).

The railcar manager 132 broadcasts, via the communication module 130, the height ($H_C$) of a space defined by platforms 120 of the railcars 102 and the ceiling 122 of the railcars 102 and/or the upper platforms 120. In some examples, the railcar manager 132 handshakes with each vehicle 100 giving it permission to load if the rail car level height is compatible with the vehicle height and required clearance. Additionally, in some examples, using the detection sensors 124, the railcar manager 132 tracks the number of vehicles 100 loaded on each level of the railcar 102. In some examples, the railcar manager 132 receives identifying information (e.g., VIN, manufacturer serial number, etc.) from the vehicle 100 and tracks the vehicle 100 that are loaded onto the railcar 102. In some such examples, the railcar manager 132 forwards the identifying information to an external server (e.g., an inventory management system) along with an identifier of the railcar 102.

When the railcar 102 is loaded (e.g., each level of the railcar 102 is loaded), the railcar manager 132 broadcasts, via the communication module 130, a message indicating that it is full indicating that it is ready for the tie-down procedure (e.g., stops are connected a rail on each side of the wheels of the vehicle 100 with a strap connected both stops is positioned over the top of the tire and tightened). In some examples, the message signals workers to perform a manual tie down procedure. Alternatively, in some examples, the message signals an autonomous tie down procedure where autonomous stops travel along the rail, stop at each side of a wheel of the target vehicle 100, use an armature to place the strap on top of the wheel, and tighten the strap.

The buck ramp 104 includes a buck ramp wireless module 134. The buck ramp wireless module 134 includes a communication module 136 and a buck ramp manager 138. The buck ramp 104 facilitated loading the vehicles 100 into the different levels of the railcars 102. In some examples, the buck ramp 104 includes a ramp height adjustment system 140 (e.g., an hydraulic system, etc.) so that the buck ramp 104 can autonomously change the level into which the vehicles 100 are loaded.

The communication module 136 includes wireless network interfaces to enable communication with the vehicles 100, the railcars 102, and/or external networks. The communication module 130 includes hardware (e.g., processors, memory, storage, antenna, etc.) and software to control the wireless network interfaces. The communication module 130 includes one or more communication controllers for standards-based networks (local area wireless networks (including IEEE 802.11 a/b/g/n/ac or others), dedicated short range communication (DSRC), personal area networks (e.g., BLUETOOTH®, Z-WAVE®, ZIGBEE, etc.)).

The buck ramp manager 138 manages the height of the buck ramp 104. Additionally, in some examples, the buck ramp manager 138 controls a gate 142 that in one position allows the vehicles 100 to enter the buck ramp 104 and in another position blocks the vehicles 100 from entering the buck ramp 104. The buck ramp manager 138 receives the height ($H_C$) of a space defined by platforms 120 of the railcars 102 and the ceiling 122 of the railcars 102 and the height of the approaching vehicle 100. When the height of the approaching vehicle 100 is greater than the height ($H_C$), and the height of a required headroom ($H_H$), the buck ramp manager 138 positions the gate 142 to block the vehicle 100 from entering the buck ramp 104. When the railcars 102 indicate that one of the levels in the last railcar 102 is full, the buck ramp manager 138 positions the buck ramp 104, via the ramp height adjustment system, to a different level.

FIG. 2 illustrates a string of railcars 102 being loaded with the autonomous vehicles 100. The railcars 102 are connected by bridges 202 that extend across gaps between the railcars 102. In the illustrated example, each railcar 102 includes the railcar wireless module 128. When the vehicle 100 is loading onto string of railcars 102, the vehicle 100 navigates to the next available space 204 in which the vehicle 100 meets the spacing requirements (e.g., the vehicle separation distance ($D_S$) and the edge separation distance ($D_E$), etc.). In some examples, when the prior railcar 102 broadcasts a message that the particular level (e.g., the upper level, the middle level, the lower level, etc.) is full, the railcar 102 autonomously raises or retracts the bridge 202.

Figure 3:
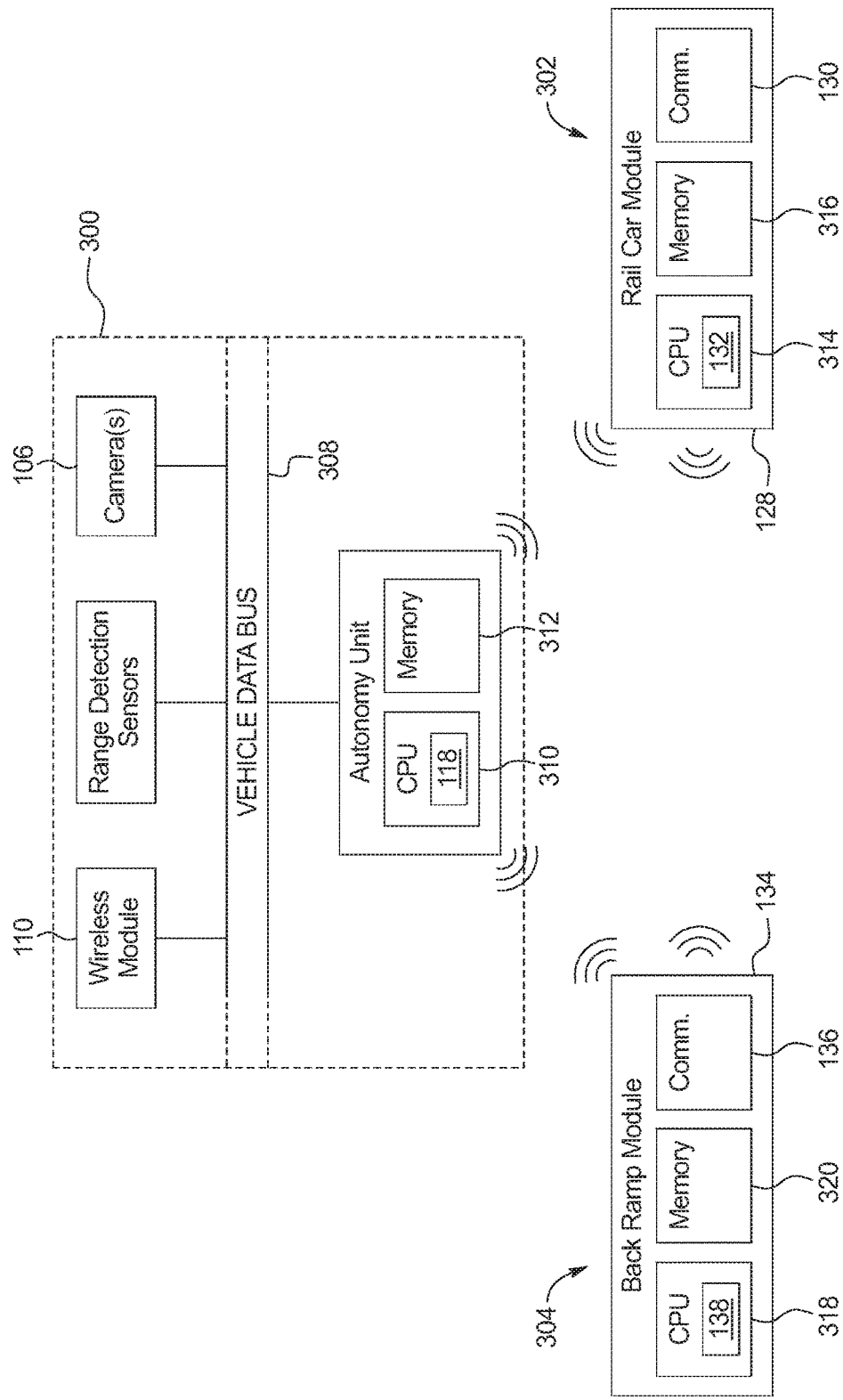
FIG. 3 is a block diagram of electronic components of the vehicle, electronic components of the railcars, and electronic components of a buck ramp.

FIG. 3 is a block diagram of electronic components 300 of the vehicle 100, electronic components 302 of the railcars 102, and electronic components 304 of the buck ramp 104. In the illustrated example, the electronic components 300 include the camera(s) 106, the range detection sensors 108, the vehicle wireless module 110, the autonomy unit 112, and a vehicle data bus 308.

In the illustrated example, the autonomy unit 112 includes a controller or processor 310 and memory 312. In the illustrated example, the autonomy unit 112 is structured to include railcar loader 118. The processor or controller 310 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 312 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 312, the computer readable medium, and/or within the processor 310 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

In the illustrated example, the vehicle data bus 308 communicatively couples the camera(s) 106, the range detection sensors 108, the vehicle wireless module 110, and the autonomy unit 112. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

The example electronic components 302 of the railcar 102 include the communication module 130, a processor or controller 314, and memory 316. In the illustrated example, the processor 314 is structured to include railcar manager 132. The processor or controller 314 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 316 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 316 includes multiple kinds of memory, particularly volatile memory and non-volatile memory.

The memory 316 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 316, the computer readable medium, and/or within the processor 314 during execution of the instructions.

The example electronic components 304 of the buck ramp 104 include the communication module 136, a processor or controller 318, and memory 320. In the illustrated example, the processor 318 is structured to include buck ramp manager 138. The processor or controller 318 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 316 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 320 includes multiple kinds of memory, particularly volatile memory and non-volatile memory.

The memory 320 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 320, the computer readable medium, and/or within the processor 318 during execution of the instructions.

Figure 4:
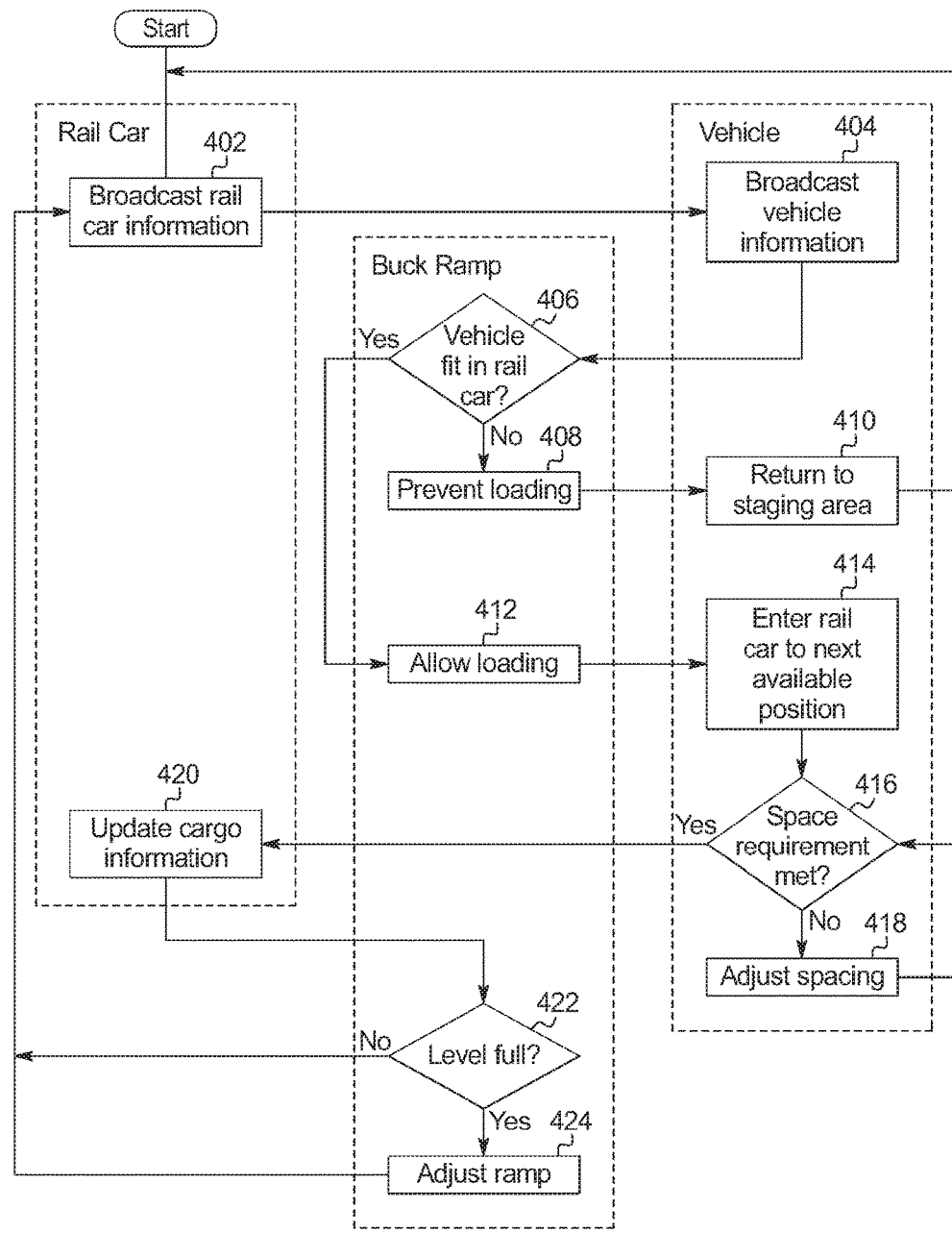
FIG. 4 is flowchart of a method to load the autonomous vehicles onto the auto railcars, which may be implemented by the electronic components of FIG. 3.

FIG. 4 is flowchart of a method to load the autonomous vehicles 100 onto the railcars 102, which may be implemented by the electronic components 300, 302 and 304 of FIG. 3. Initially, at block 402, the railcar wireless module 128 broadcasts railcar information. The railcar information includes the heights ($H_C$) of the levels of the railcar 102 and/or the current capacity of each level of the railcar 102. At block 404, the railcar loader 118 of the vehicle 100 broadcasts vehicle information via the vehicle wireless module 110. The vehicle information includes the height of the vehicle 100 and/or identifier(s) of the vehicle 100. At block 406, the buck ramp manager 138 determines whether the vehicle 100 will fit in the railcar 102 based on the railcar information and the vehicle information. For example, the buck ramp manager 138 may compare the heights ($H_C$) of the levels of the railcar 102 to the height of the vehicle 100. When the vehicle 100 does not fit, the method continues to block 408. Otherwise, when the vehicle 100 does fit, the method continues at block 412.

At block 408, the buck ramp manager 138 prevents the vehicle 100 from entering the buck ramp 104. In some examples, the buck ramp manager 138 raises or closes the gate 142 and/or broadcasts a message indicating to the vehicle 100 that it does not fit. At block 410, the railcar loader 118 returns the vehicle 100 to a staging area.

At block 412, the buck ramp manager 138 broadcasts a message indicating that the vehicle 100 will fit. At block 414, the railcar loader 118 navigates the vehicle 100 to the next available position on the string of railcars 102. At block 416, using the camera(s) 106 and/or the range detection sensors 108, the railcar loader 118 determines whether it is satisfying the space requirements (e.g., the vehicle separation distance ($D_S$) and the edge separation distance ($D_E$), etc.). When the vehicle 100 does not satisfy the space requirements, at block 418, the railcar loader 118 adjusts the position of the vehicle 100. When the vehicle 100 does satisfy the space requirements, at block 420, the railcar manager 132 updates its cargo information to indicate that the vehicle is stored inside the particular railcar 102.

At block 422, the buck ramp manager 138, based on information from the railcars 102, determines whether the current level to which the height of the buck ramp 104 is set is fully. At block 424, then the current level is full, the buck ramp manager 138 adjusts the buck ramp 104 to a different level.

The flowchart of FIG. 4 is representative of machine readable instructions stored in memory (such as the memory 312, 316, and 320 of FIG. 3) that comprise one or more programs that, when executed by a processor (such as the processors 310, 314, and 318 of FIG. 3), cause the vehicle 100, the railcar 102, and/or the buck ramp 104 to implement the example railcar loader 118, the example railcar manager 132, and/or the example buck ramp manager 138 of FIGS. 1, 2, and 3. Further, although the example program(s) is/are described with reference to the flowchart illustrated in FIG. 4, many other methods of implementing the example railcar loader 118, the example railcar manager 132, and/or the example buck ramp manager 138 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system comprising:
   a railcar with a first wireless communication module, the railcar to:
   broadcast dimension data, the dimension data including heights of levels inside the railcar;
   communicate capacity data to approaching autonomous vehicles;
   when one of the levels of the railcar is full, broadcast a message indicating the one of the levels is full; and
   a buck ramp with a second wireless communication module, the buck ramp to, when one of the levels of the railcar is full, autonomously adjust a height of the buck ramp to a different level.

2. The system of claim 1, wherein the railcar includes motion detection sensors at each entrance and exit of the railcar, and wherein the railcar is to track the railcar's capacity by detecting when the autonomous vehicles entering and leaving the railcar.

3. The system of claim 2, wherein the railcar is to determine when one of the autonomous vehicles in parked in the railcar based on the motion detection sensors and to update cargo information with identifying information received from the parked one of the autonomous vehicles.

4. The system of claim 2 wherein the railcar is to:
   determine when the railcar is full based on the motion detection sensors; and
   when the railcar is full, broadcast a message indicating that it the railcar is at full capacity.

5. The system of claim 1, wherein the buck ramp includes a gate, and wherein the buck ramp is to prevent the autonomous vehicles from entering the railcar using the gate based on the dimension data of the railcar and heights of the autonomous vehicles.

6. The system of claim 1, wherein the railcars includes indicia on each of the levels demarcating a railcar edge space requirement.

7. The system of claim 1, wherein the railcar includes a level sensor to measure a height of an adjustable platform that defines the levels of the railcar.

8. The system of claim 7, there the railcar is to determine the dimension data based on an interior height of the railcar and the position of the platform measured by the level sensor.

9. A system comprising:
   a railcar with a first wireless communication module, the railcar to:
   broadcast dimension data including heights of railcar levels;
   communicate capacity data to approaching autonomous vehicles; and
   broadcast, when a first level is full, a message indicating the first level is full; and
   a buck ramp with a second wireless communication module, the buck ramp to autonomously adjust a buck ramp height to a second level when the first level is full.

10. The system of claim 9, wherein, to track a capacity of the railcar, the railcar includes a motion detection sensor at each entrance and exit of the railcar for detecting when the autonomous vehicles are entering and leaving the railcar.

11. The system of claim 9, wherein the railcar is to:
    determine, based on motion detection sensors, when the railcar is full; and
    broadcast a second message indicating full capacity when the railcar is full.

12. The system of claim 9, wherein the buck ramp includes a gate and is configured to prevent the autonomous vehicles from entering the railcar using the gate based on the dimension data of the railcar and heights of the autonomous vehicles.

13. The system of claim 9, wherein the railcar includes a level sensor to measure a height of an adjustable platform that defines the railcar levels.

14. A method comprising:
    broadcasting, via first wireless communication module of a railcar, dimension data including heights of railcar levels;
    communicating, via the railcar, capacity data to approaching autonomous vehicles;
    broadcasting, via the railcar, a message indicating a first level is full when the first level is full; and
    autonomously adjusting, upon receiving the message via a second wireless communication module of a buck ramp, a buck ramp height to a second level.

15. The method of claim 14, further including tracking a capacity of the railcar by detecting when the autonomous vehicles are entering and leaving the railcar via motion detection sensors at each entrance and exit of the railcar.

16. The method of claim 15, further including determining when the railcar is full based on motion detection sensors and broadcasting a second message indicating full capacity when the railcar is full.

17. The method of claim 14, further including preventing the autonomous vehicles from entering the railcar, using a gate of the railcar, based on the dimension data of the railcar and heights of the autonomous vehicles.

18. The method of claim 14, further including measuring a height of an adjustable platform that defines the railcar levels via a level sensor of the railcar.

* * * * *